United States Patent [19]
Mizouchi

[11] Patent Number: 5,717,413
[45] Date of Patent: Feb. 10, 1998

[54] CONTROL DEVICE FOR DISPLAY DEVICE

[75] Inventor: Satoru Mizouchi, Utsunomiya, Japan

[73] Assignee: Canon Kabushiki Kaisha, Tokyo, Japan

[21] Appl. No.: 825,428

[22] Filed: Mar. 28, 1997

Related U.S. Application Data

[62] Division of Ser. No. 408,053, Mar. 21, 1995, abandoned.

[30] Foreign Application Priority Data

Mar. 23, 1994 [JP] Japan ..................... 6-076568

[51] Int. Cl.⁶ ..................................... G09G 5/00
[52] U.S. Cl. .................... 345/7; 345/157; 345/158
[58] Field of Search ................... 345/7, 8, 157, 345/58, 156, 159, 169, 145, 146; 340/825.19; 351/208, 209, 210; 364/514 R, 516, 550; 250/221

[56] References Cited

U.S. PATENT DOCUMENTS

| | | | |
|---|---|---|---|
| 4,109,145 | 8/1978 | Graf | 345/146 |
| 4,984,179 | 1/1991 | Waldern | 345/8 |
| 5,360,971 | 11/1994 | Kaufman et al. | 340/825.19 |

*Primary Examiner*—Xiao Wu
*Attorney, Agent, or Firm*—Robin, Blecker, Daley and Driscoll

[57] ABSTRACT

There is disclosed an image display control system comprising a display device for forming an image, a detection device for detecting the moving direction or moving velocity of the visual axis of an eye of the observer, and a control device for controlling the display state of the display device according to the detection signal from the detection device, or an image display device capable of detecting the moving direction or moving velocity of the visual axis thereby anticipating the position of the gazing point of the observer.

4 Claims, 8 Drawing Sheets

CONTROL DEVICE FOR DISPLAY DEVICE

This is a continuation application under 37 CFR 1.62 of prior application Ser. No. 08/408,053, filed Mar. 21, 1995, now abandoned.

BACKGROUND OF THE INVENTION

1. Field of the Invention

The present invention relates to a visual control device for display means, capable of detecting a visual axis information, such as the gazing point, moving direction of the visual axis or velocity of said movement, of the observer watching the image information displayed on the display means, and suitably controlling the displayed image information utilizing the visual axis information, thereby enabling observation of the image information and associated operations in comfortable manner.

2. Related Background Art

There has been already known a visual axis-controlled image display device, capable of detecting the information on the visual axis of the observer watching the image displayed on display means and controlling the image information displayed on the display means according to the visual axis information.

For example the Japanese Patent Laid-open Application No. 2-173696 discloses an image display device having image information constituting an area wider than the display image area and capable of automatically displaying an adjacent image area if the visual axis of the observer is fixed for a predetermined time on a specified part of the display means, thereby allowing unhindered use of both hands of the observer.

Also the Japanese Patent Laid-open Application No. 1-122799 discloses an image information display device having plural display units and displaying detailed image information on a display unit observable on the visual axis while displaying simplified image information on other display units for which detailed observation is difficult, thereby alleviating the burden of the display processing device and improving the cost performance.

Furthermore, the Japanese Patent Laid-open Application No. 1-141479 discloses an image transmission-reception system utilizing the visual axis information, capable of feedback control by sending the visual axis information, such as the gazing point, of the observer watching the image information displayed on the display means of the receiving side to the transmitting side, and transmitting the image information, weighted according to thus sent visual axis information, from the transmitting side to the receiving side, thereby displaying detailed image information only in an area in the vicinity of the gazing point but displaying coarse image information in other areas, thus enabling to receive the image of high quality in an economical manner.

However, in the above-mentioned image display device in which image information corresponding to an area wider than the display image area is stored in memory means and is read therefrom for display according to the visual axis information, the movement of the observer is inevitably limited as the visual axis thereof has to be fixed for a predetermined time on a specified part of the display means.

Also the above-mentioned image display devices may be unable to respond to a rapid shift of the visual axis of the observer.

Also in the above-mentioned image transmission-reception system in which the weighted image information is displayed only in the vicinity of the gazing point based on the visual axis information, the display of the weighted image information in the vicinity of the gazing point is delayed after the visual axis is moved rapidly, so that the operation of the observer becomes limited.

SUMMARY OF THE INVENTION

The visual axis-controlled image display device of the present invention has the following construction.

The visual axis-controlled image display device, for detecting the visual axis information of the observer observing the image information displayed on the display means by means of visual axis information detecting means, and causing control means to display the information on the display means based on the visual axis information from the visual axis information detecting means, is characterized in that at least either of the information on the moving direction of the visual axis on the display means and the information on the velocity of movement of the visual axis is used as the visual axis information.

It is also characterized in that the information on the gazing point on the display means and the information on the moving direction of the visual axis are used as the visual axis information.

It is furthermore characterized in that the control means extracts, for display on the display means, image information based on the visual axis information from image memory means storing image information of an area wider than the image information displayed on the display means.

According to a first aspect of the present invention, there is provided an image display device comprising:

first detection means for detecting the state of the eye of an observer;

second detection means for detecting the moving direction or moving velocity of the eye from the detection signal of the first detection means; and means for predictingly, calculating, the gazing position of the observer at least by the second detection means.

According to another aspect of the present invention, there is provided a display control system comprising:

display means for forming an image;

detection means for detecting the moving direction or the moving velocity of the visual axis of an observer; and control means for controlling the display state of the display means by the detection signal from the detection means.

DETAILED DESCRIPTION OF THE PREFERRED EMBODIMENTS

Figure 1:
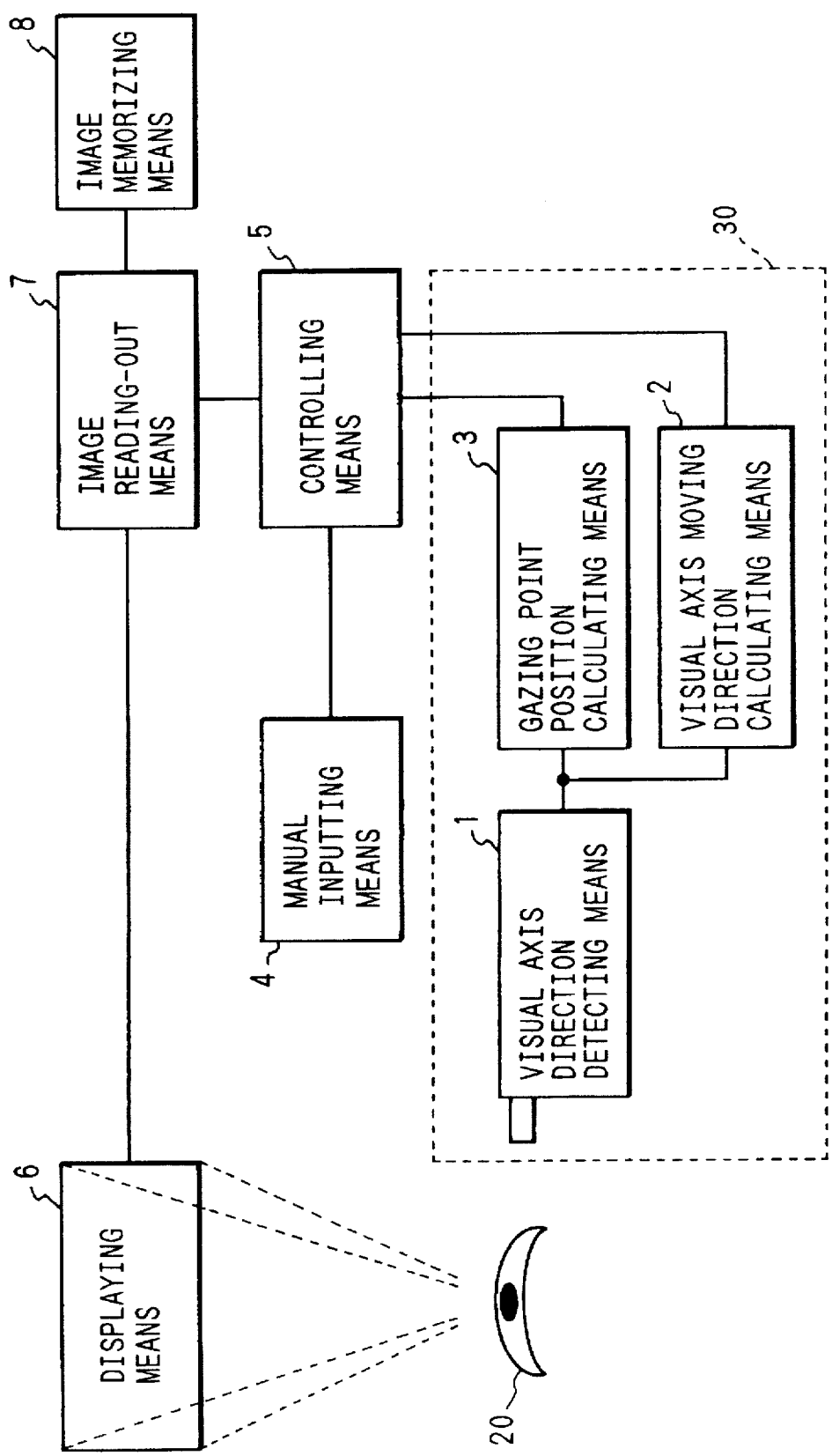
FIG. 1 is a block diagram of the principal part of a first embodiment of the present invention.

FIG. 1 is a block diagram of the principal part of a first embodiment of the present invention. The embodiment represents a visual axis-controlled image display device capable of storing in memory means, image information constituting an area wider than the image area displayed on the display means, and displaying, on said display means, the image information extracted from the memory means based on the visual axis information of the observer.

Displaying means 6, composed of a cathode ray tube or a liquid crystal display device, displays image information transmitted from image memory means to be explained later.

Visual axis information detecting means 30 detects the direction of visual axis of the observer watching the image information displayed on the display means 6, thereby detecting the visual axis information such as the gazing point on the display face of the display means 6 or the moving direction of the visual axis. The visual axis information detecting means 30 is composed of visual axis direction detecting means 1, visual axis moving direction calculating means 2, and gazing point position calculating means 3.

The visual axis direction detection means 1 detects the direction of the visual axis of the observer watching the display means 6.

The visual axis moving direction calculating means 2 calculates the moving direction of the visual axis of the observer on the display means, utilizing the visual axis information from the visual axis direction detecting means 1.

The gazing point position calculating means 3 calculates, at every predetermined interval, the position of the gazing point of the observer on the display means 6, utilizing the visual axis information from the visual axis direction detecting means 1.

Manual inputting means 4 enters information other than the visual axis to controlling means 5, which controls the entire device.

Image reading-out means 7 reads predetermined image information from image memory means 8, according to an instruction from the control means 5.

The image memorizing means 8 is composed of a memory medium of a large capacity, such as a magnetic disk of a magnetooptical disk.

There is also shown an eye 20 of the observer.

In the following there will at first be explained the visual axis direction detecting means 1 to be employed in the present embodiment.

Though various methods have been proposed for detecting the direction of visual axis, a method of irradiating the eyeball surface with infrared light and determining the visual axis by the reflected image is suitable for equipment of a wide range since it is a non-contact measuring method and does not give burden to the observer. Such visual axis direction detecting method is proposed, for example, in the Japanese Patent Laid-open Application Nos. 1-241511, 1-274736, 2-264632 and 4-138432.

Figure 3:
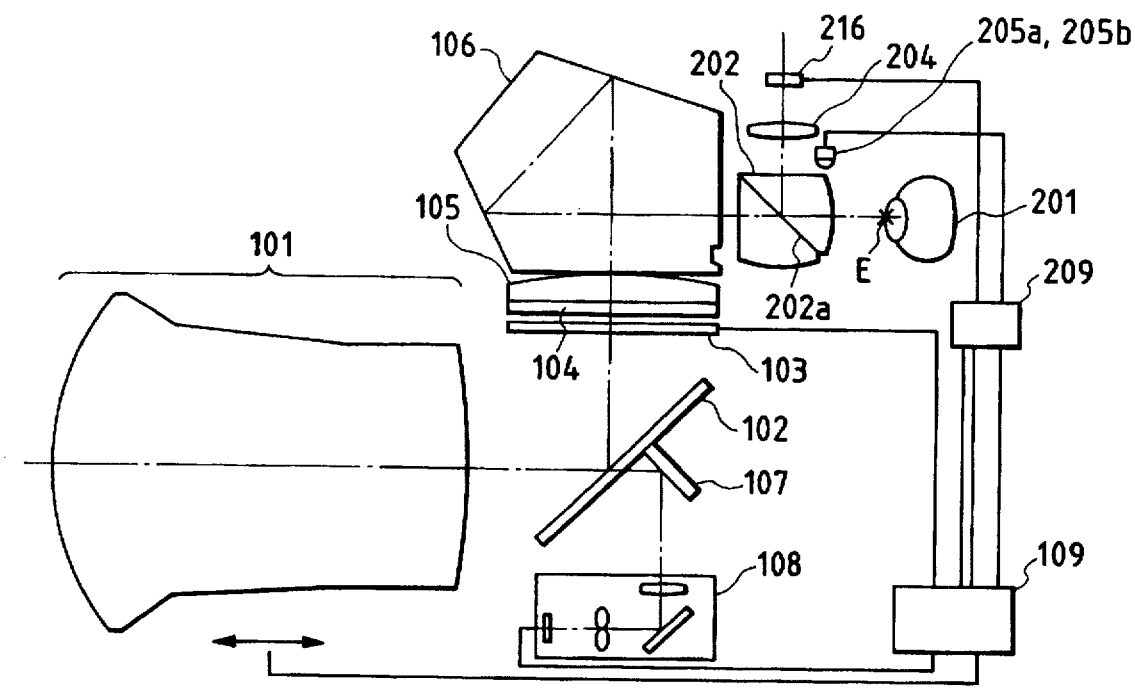
FIG. 3 is a schematic view of a single-lens reflex camera having a visual axis information detecting device.

FIG. 3 is a schematic view of the visual axis direction detecting means of the present embodiment, applied in the view finder of a single-lens reflex camera.

In FIG. 3 there are shown a phototaking lens 101, a quick-return mirror 102, a liquid crystal display device 103 for displaying for example the distance measuring area, a focusing screen 104, a condenser lens 105, a pentagonal roof prism 106, a sub mirror 107 attached to a part of the quick-return mirror 102, a multi-point focus detecting device 108, and a control device 109 of the camera.

The visual axis direction detecting device in FIG. 3 is composed of an eyepiece lens 202, in which a dichroic mirror 202a, capable of transmitting the visible light and reflecting the infrared light, is obliquely provided, a light-receiving lens 204, infrared light sources 205 (205a, 205b) such as infrared light emitting diodes, an image sensor 216, composed of a two-dimensional array of photoelectrical elements and so positioned as to be conjugate with the pupil of the eye of the observer at a predetermined position, with respect to the light-receiving lens 204 and the eyepiece lens 202, and a visual axis calculation process device 209 capable of detecting the direction of visual axis, calculating correction for the visual axis, storing the correction data for the visual axis and controlling the infrared light sources 205a, 205b. The visual axis direction detecting means is composed of the above-mentioned components 202, 204, 205, 209 and 216.

Figure 4:
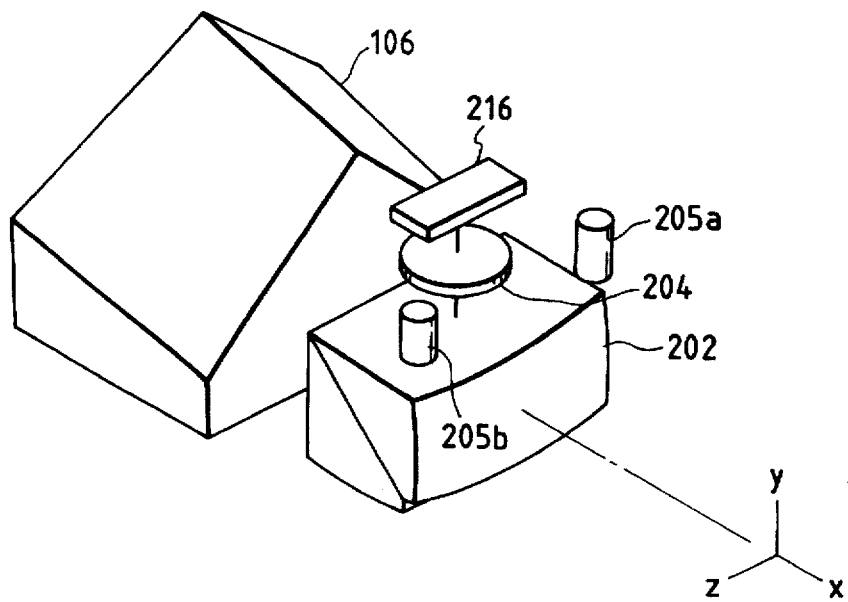
FIG. 4 is a schematic perspective view of principal part of the visual axis information detecting means shown in FIG. 3.

FIG. 4 is a perspective view of the principal part of the visual axis direction detecting means shown in FIG. 3, wherein a pair of infrared light sources are employed for diverging illumination of the eye.

Figure 5A:
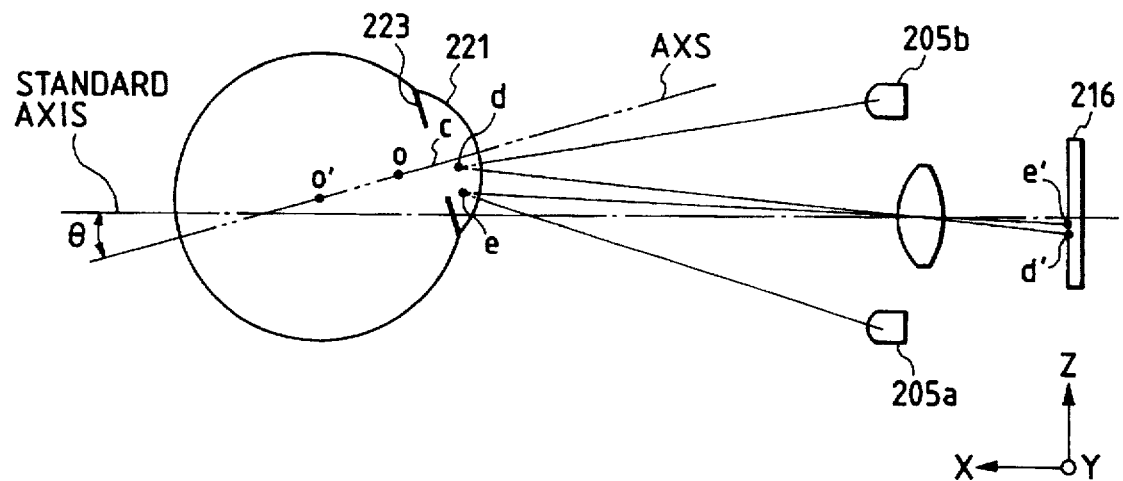
FIG. 5A is a view for explaining principle of the visual axis direction detecting means.
Figure 5B:
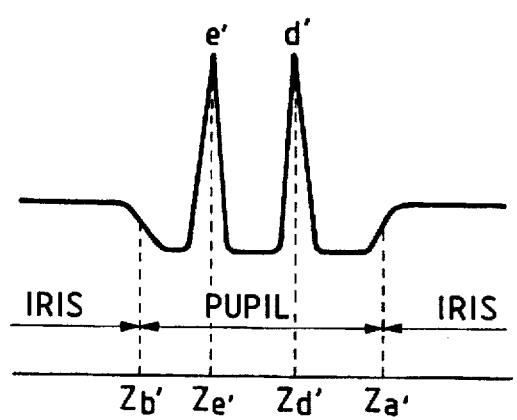
FIG. 5B is a view showing the output signals of an image sensor 216.

FIG. 5A is a view for explaining the principle of detection of the direction of visual axis, and FIG. 5B is a view for explaining the output signals of the image sensor 216 shown in FIG. 5A. In the following there will be hereinafter explained, with reference to these drawings, the principle of detection of the direction of visual axis.

The frontal portion of the eyeball is illuminated by the infrared light sources 205a, 205b, and the reflection on the surface of the cornea forms false images e, d of the infrared light sources in the eyeball. These primary images e, d of the infrared light sources are focused, by the eyepiece lens and the light-receiving lens, as secondary images e', d' on the image sensor 216. Z-coordinates $Z_{e'}$, $Z_{d'}$ of the images are determined from the output signals of the image sensor 216. Also Z-coordinates $Z_{a'}$, $Z_{b'}$ of images a', b' of the end of the iris 223 are determined from the outputs of the image sensor. Based on the geometrical consideration, the rotation angle θ of the visual axis AXS of the eyeball with respect to a reference axis of the visual axis detecting system is given by:

$$\beta \cdot OC \cdot \sin \theta = \{(Z_{a'}+Z_{b'})-(Z_{d'}+Z_{e'})\}/2 \tag{1}$$

wherein β is the imaging magnification of the eyeball on the image sensor and can be determined from the distance of the secondary images e' and d' of the infrared light sources; and OC is the standard distance from the center O of curvature of the cornea 221 to the center C of the pupil. The coordinates of the gazing point on the focusing screen can be easily determined from the angle θ and the data of the finder optical system.

The foregoing explanation has been limited to a case where the eyeball rotates in the Z-X plane, but the rotation angle can be determined in any situation by a similar method.

The visual axis direction detecting means in the present embodiment may be same as that shown in FIG. 3, but a flat or spherical dichroic mirror capable of transmitting the visible light and reflecting the infrared light is preferably provided in oblique manner, in place for the eyepiece lens.

In the present embodiment, at the observation, the visual axis direction detecting means is fixed with respect to the image displayed on the display means 6, whereby the eye position of the observer is substantially fixed.

Then there is conducted the initial measurement of the display image area, for determining the distance from the eye position to the display image area and the inclination of the plane of the display image area with respect to the eye. The principle and method of such measurement will be explained in the following.

Figure 6A:
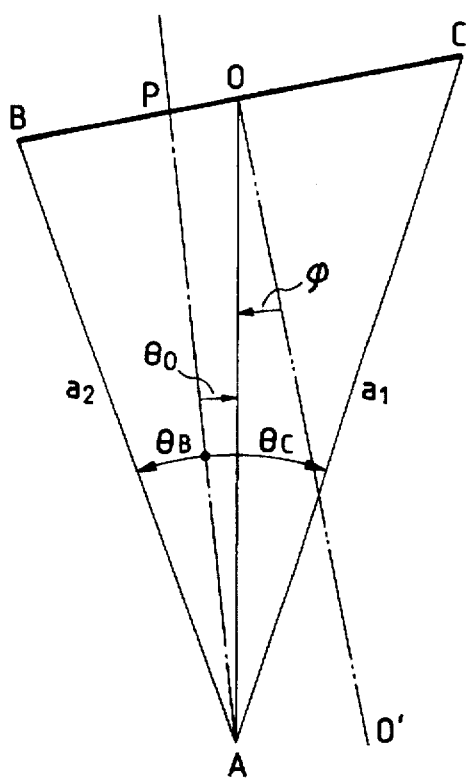
FIG. 6A is a view for explaining the principle of initial measurement.

It is assumed that the display image area of the display means is rectangular, with a central point $0$, and being symmetrically divided in the vertical direction, by a line BOC. FIG. 6A is a schematic view for explaining the display image area BC and the eyeball position A, in a plane containing the eyeball A and the line BOC. The point $0$ is at the center of a line BC, and the lengths of the lines BO and CO are known as s. A line AP indicates the reference axis (standard axis) of the visual axis direction detecting means. A normal line OO' is drawn from the point O' to the line BC, and the angle between the normal line OO' and the line OA is taken as $\phi$, and the lengths of the lines CA and BA are respectively taken as $a_1$ and $a_2$. All the angles are taken as positive or negative, respectively in clockwise or counter-clockwise direction.

At first the visual axis directions $\theta_B$, $\theta_O$ and $\theta_C$ are measured respectively when the observer watches the points B, O and C on the display image area, and there are calculated $\angle OAC=\theta_1=\theta_C-\theta_O$ and $\angle BAO=\theta_2=\theta_B-\theta_O$. Based on geometrical relations, there stand following three relations:

$$(2s)^2 = a_1^2 + a_2^2 - 2 \cdot a_1 \cdot a_2 \cdot \cos(\theta_1 - \theta_2) \quad (2)$$

$$a_1 \cdot \sin\theta_1 = s \cdot \cos\theta \quad (3)$$

$$-a_2 \cdot \sin\theta_2 = s \cdot \cos\phi \quad (4)$$

Based on these equations, the equation (2) can be rewritten as follows:

$$\cos^2\phi = 4/k \quad (5)$$

wherein:

$$k = (1/\sin^2\theta_1) + (1/\sin^2\theta_2) + 2\cos(\theta_1-\theta_2)/(\sin\theta_1 \cdot \sin\theta_2) \quad (6)$$

The inclination $\phi$ of the display image area, and the distances $a_1$, $a_2$ to the display image area, can be determined from the equation (5) and the relationship of magnitudes of $\theta_1$ and $\theta_2$.

The initial measurement is completed in this manner. It is however repeated each time the position or inclination of the visual axis direction detecting means is varied with respect to the display image area.

In the following there will be explained the principle and method for determining the corresponding point in the display image area, from the rotation angle $\theta$ of the visual axis AXS of the eyeball when the operation utilizing the actual image is started after the initial measurement.

Figure 6B:
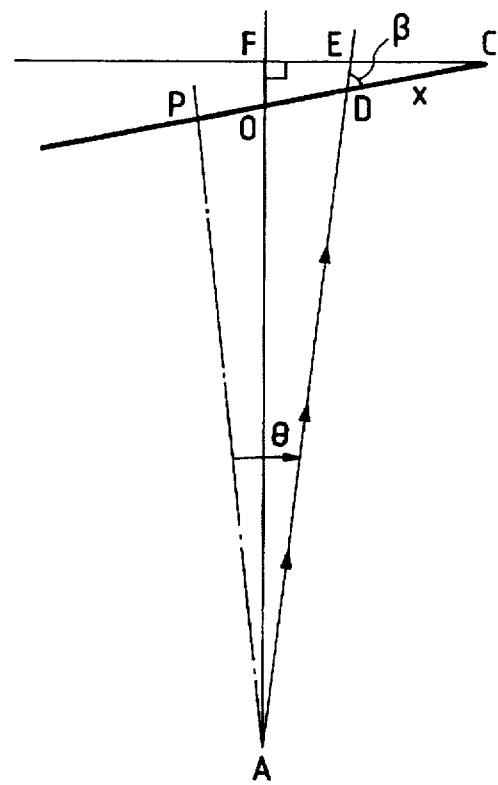
FIG. 6B is a view for explaining the principle of determining the coordinate of the gazing point from the rotation angle θ of the eyeball.

FIG. 6B is a schematic view showing the principle for obaining the coordinate of the gazing point from the rotation angle $\theta$ of the eyeball. In FIG. 6B, D indicates the gazing point on the display image area. A normal line is drawn from the point C to the line AO, and the crossing points with the lines AO and AD are respectively defined as F and E, and the length of the line CE is defined as b. The coordinate x of the point D, or the length of the line CD, is determined in the following manner. For a rotation angle $\theta$ of the eyeball with respect to the reference axis AP:

$$b = FC - AF \cdot \tan(\theta - \theta_0)$$

$$b = s \cdot \cos\phi - \{a_1^2 - (s \cdot \cos\phi)^2\}^{1/2} \cdot \tan(\theta - \theta_0) \quad (7)$$

On the other hand, following relations are derived from the triangle EDC:

$$(x - b \cdot \cos\phi) \cdot \tan\beta = -b \cdot \sin\phi \quad (8)$$

$$\beta = 90° + \phi - (\theta - \theta_0) \quad (9)$$

Therefore:

$$x = -b \cdot [\sin\phi \cdot \tan\{-\phi + (\theta - \theta_0)\} - \cos\phi] \quad (10)$$

Consequently, for the given rotation angle $\theta$ of the eyeball, there can be calculated, from the equations (7) and (10), the coordinate x of the corresponding gazing point on the display image area.

In the foregoing explanation, the coordinate of the gazing point is determined on the line BOC which divides the image area in the vertical direction, but the coordinates of any arbitrary gazing point on the image area can be determined in a similar manner.

In the first embodiment, the direction of the visual axis is measured, by the above-explained method, consecutively at every predetermined small interval, and the gazing point is determined by the gazing point calculating means 3 while the moving direction of the visual axis is determined by the visual axis moving direction calculating means 2, from the change of the gazing point.

In the following there will be explained the operation, in the present embodiment, of displaying the adjacent image, based on the gazing point and the moving direction of the visual axis.

Figure 2:
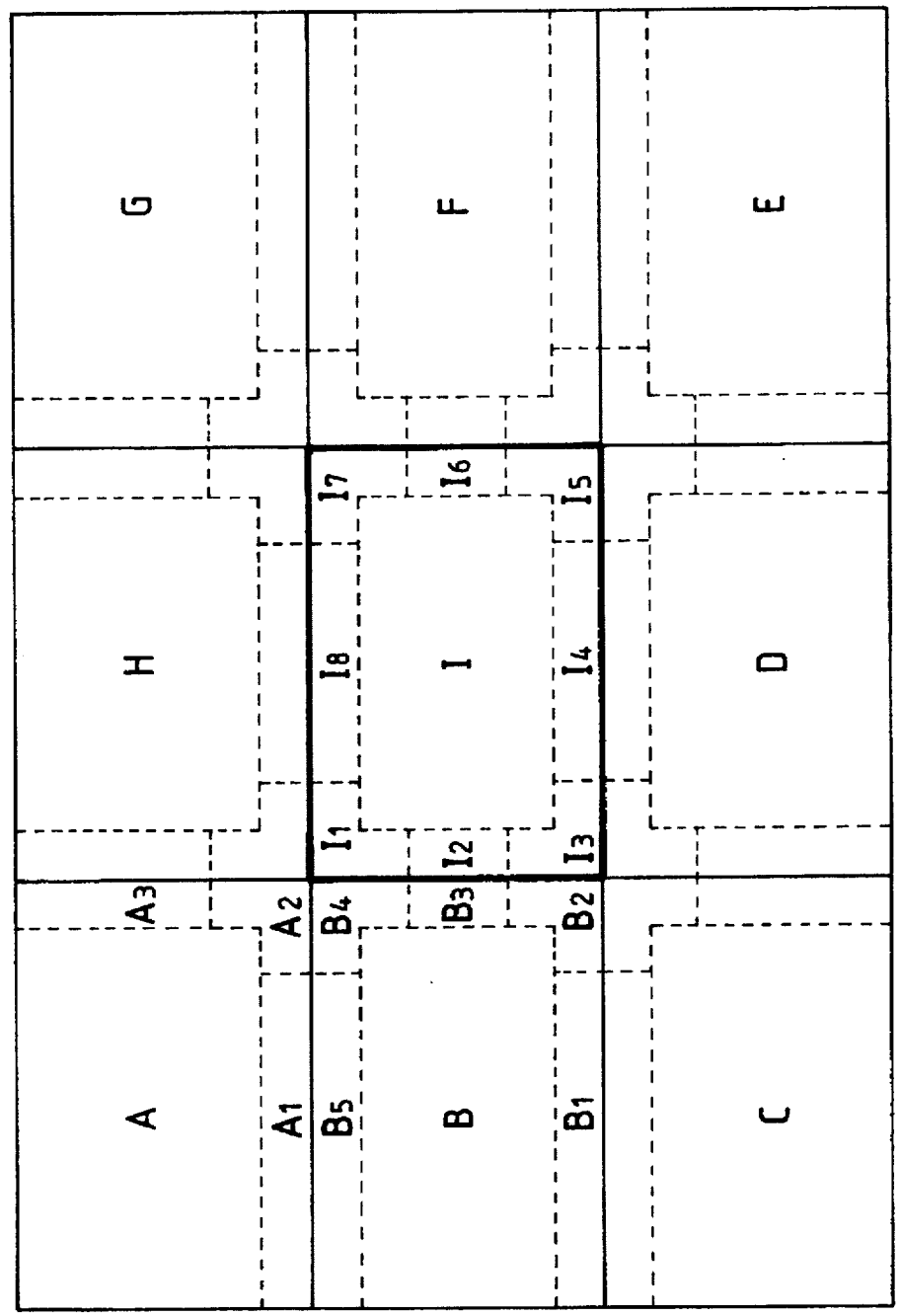
FIG. 2 is a view showing an example of the image information having an area wider than the image display area.

It is now assumed that the image information, memorized in the image memory means 8 of the present embodiment, is composed of nine images A to I as shown in FIG. 2. Such images are obtained by dividing originally continuous image information into nine areas, and it is assumed that the observer is currently observing the image information I on the display means 6.

The periphery of the image I is divided, as shown in FIG. 2, into eight areas $I_1$ to $I_8$, corresponding to eight images to which movements are possible from the image I.

In case the gazing point is in the area $I_1$ in the displayed image area I and the moving direction of the visual axis, identified by the visual axis moving direction calculating means 2, is toward upper left, the control means 5 reads, through the image read-out means 7, the image information A from the image memory means 8 and displays the image A on the display means 6, instead of the image I. Similarly the image H is read and displayed if the gazing point lies in the area $I_1$ and the moving direction of the visual axis is straight upwards, and the image B is read and displayed if the moving direction is to the left. The control means does not respond to any other moving direction of the visual axis.

More specifically, in case the gazing point is in the area $I_2$, the image B is displayed only when the moving direction of the visual axis is to the left, and no response is made to any other moving directions.

When the image A is displayed, the periphery thereof is divided into three areas $A_1$ to $A_3$, since the image A has thereararound three images which can be moved in three directions. Thus the image B is displayed instead of the image A if the gazing point lies in the area $A_1$ and the moving direction of the visual axis is detected as downwards. If the gazing point lies in the area $A_2$, the image H, I or B is displayed respectively when the moving direction of the visual axis is to the right, to the lower right or downwards, but no response is made to any other moving directions of the visual axis.

The data of the divided patterns of the periphery of each image and the image selecting information corresponding to the moving direction of the visual axis in each divided pattern are stored in relation to the image information of each image.

In the present embodiment, owing to the configuration explained above, desired new image information is immediately displayed by detecting the moving direction of the visual axis of the observer in the peripheral portion of the displayed image.

Figure 7:
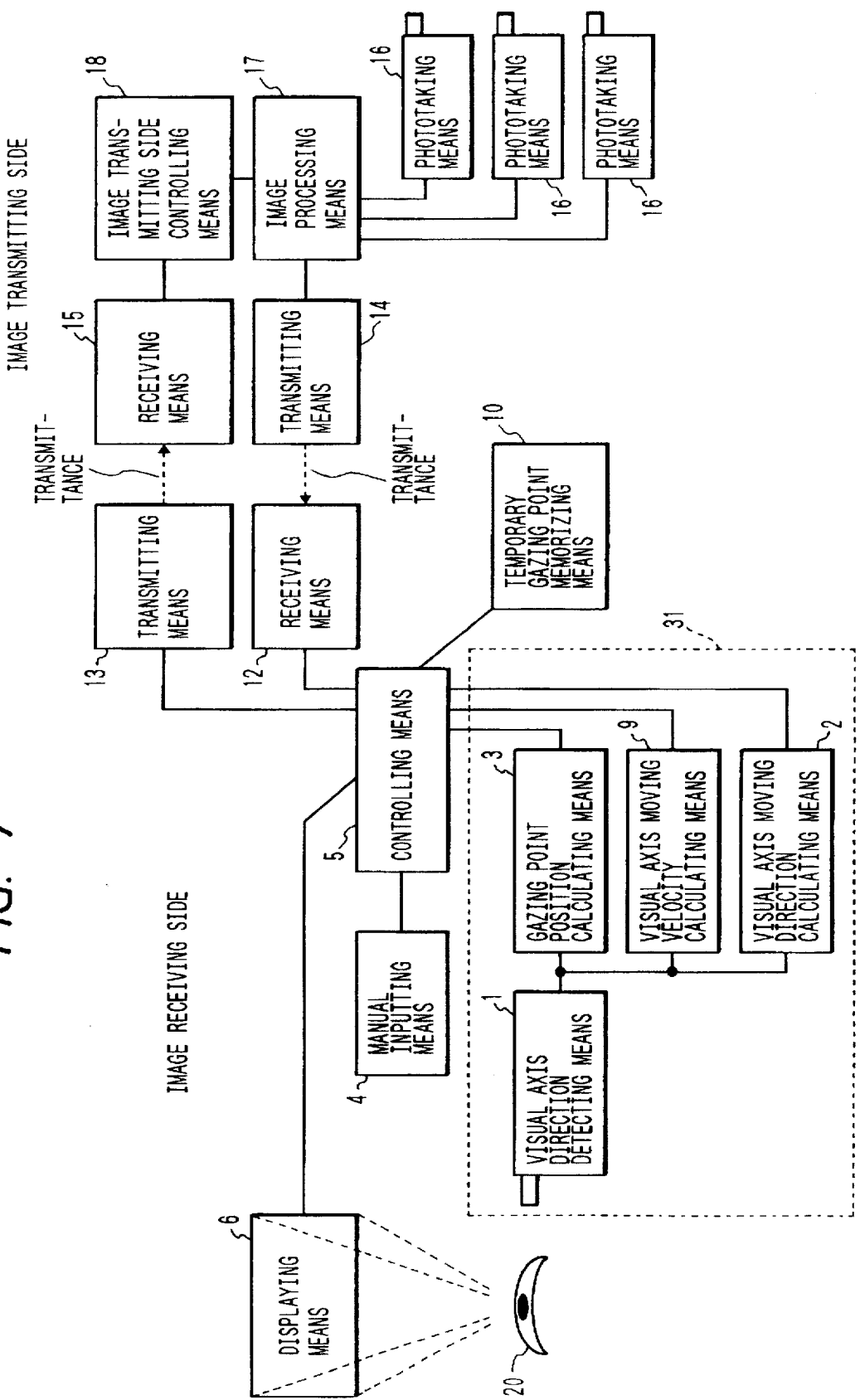
FIG. 7 is a block diagram of the principal parts of a second embodiment of the present invention.

FIG. 7 is a block diagram of the principal part of a second embodiment of the present invention, in which the visual axis information relating to the gazing point is transmitted from the receiving side of the image information to the transmitting side, which in response transmits the image information weighted, for example image information of a high definition, only in the vicinity of the gazing point, in order to reduce the amount of the image information to be transmitted.

In FIG. 7, components equivalent in function to those in the first embodiment are represented by same numbers.

Visual axis moving velocity calculating means 9 calculates the velocity of movement of the visual axis, from the moving distance of the gazing point of the observer on the display means 6 and the time required for the movement.

Visual axis information detecting means 31, for detecting the direction of visual axis of the observer observing the image information displayed on the display means 6 thereby detecting the visual axis information such as the gazing point in the display area of the display means 6, the moving direction of the visual axis and the velocity of the movement, is composed of visual axis direction detecting means 1, visual axis moving direction calculating means 2, gazing point position calculating means 3, and visual axis moving velocity calculating means 9.

Temporary gazing point memorizing means 10 is a writable-erasable memory memorizing the position of the gazing point, after the visual axis movement, in a matrix composed of the data of past visual axis movement, i.e. the position of the gazing point prior to movement, the moving direction of the visual axis and the velocity of the movement. The above-mentioned position of the gazing point after the visual axis movement will be hereinafter referred to as the temporary gazing point.

Receiving means 12 of the image receiving side receives the image information transmitted from the image transmitting side.

Transmitting means 13 of the image receiving side transmits the information on the temporary gazing point and other information to the image transmitting side.

Transmitting means 14 of the image transmitting side transmits the image information and other information to the image receiving side.

Receiving means 15 of the image transmitting side receives the information on the temporary gazing point and other information, transmitted from the image receiving side.

Phototaking means 16 may be provided in an arbitrary number.

Image processing means 17 processes the image obtained by the phototaking means 16, according to the instruction from control means 18 of the image transmitting side, for controlling the entire transmitting side.

The image receiving side is composed of blocks 1, 2, 3, 4, 5, 6, 9, 10, 12, 13 and 31, while the image transmitting side is composed of blocks 14 to 18.

In the following there will be explained the function of the second embodiment.

Also in this second embodiment, as in the first embodiment, the visual axis information detecting means 31 detects the moving direction of visual axis of the observer at every predetermined small time interval, and calculates the gazing point, the moving direction of the visual axis and the velocity of movement of the visual axis.

The present embodiment operates in two modes according to whether the velocity of movement of the visual axis exceeds a predetermined threshold value or not.

Figure 8:
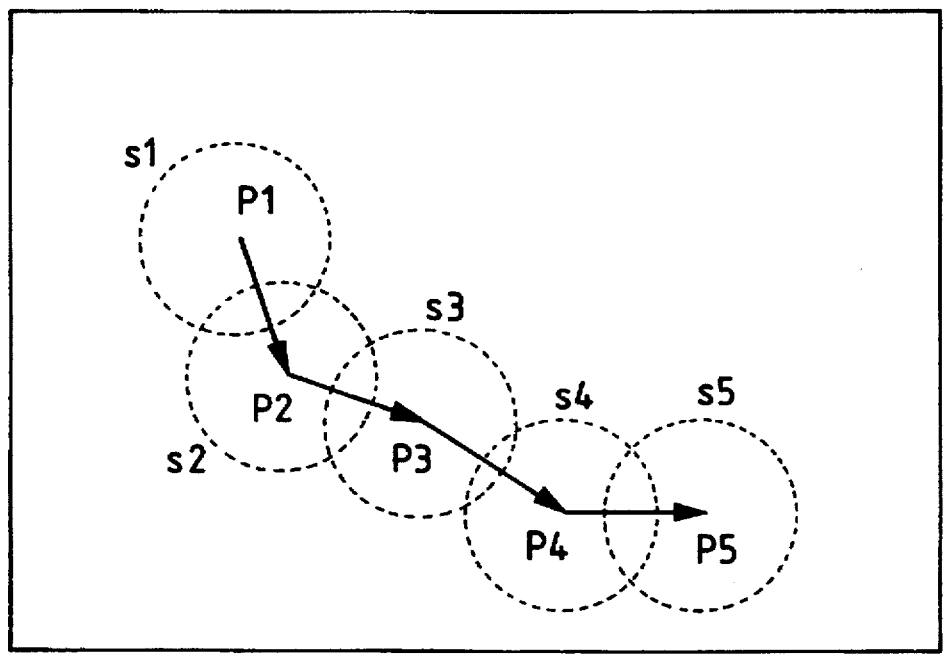
FIG. 8 is a schematic view of the display image area in a low-speed mode.

At first there will be explained a low-velocity mode in case the velocity of movement of the visual axis of the observer is smaller than the predetermined threshold value. FIG. 8 shows an example, in such case, of movement of the gazing point on the display image area of the display means 6, wherein the gazing point continuously moves from P1 to P2, P3, P4 and P5 in succession. In such case the image receiving side transmits the gazing point information without change to the image transmitting side. If the gazing point lies at P1, the image transmitting side transmits image information of higher definition within a predetermined area s1 around the gazing point P1 and rougher image outside the area, and the image receiving side displays such image information on the display means 6.

Consequently, as the gazing point moves from P1 to P2, P3, P4 and P5, the display area of the higher-definition image moves to s2, s3, s4 and s5.

In the present embodiment, the actual gazing point is aberrated from the center of display area of the higher-definition image since the process from the visual axis detection to the display involves multiple steps such as the calculation of the gazing point, calculation of velocity of the visual axis movement, transmission of the visual axis information, image processing and image transmission. However, in the low-velocity mode, the aberration is contained in the display area of the higher-definition image because the velocity of visual axis movement is low.

In the following there will be explained the high-velocity mode in which the velocity of visual axis movement exceeds the threshold value.

Figure 9:
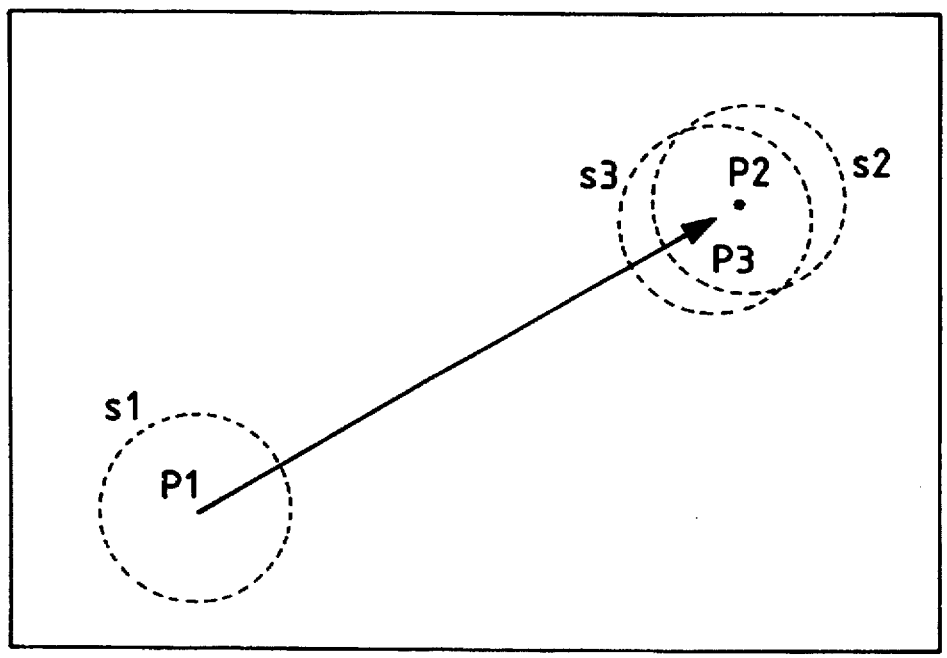
FIG. 9 is a schematic view of the display image area in a high-speed mode.

FIG. 9 shows an example of the movement of the gazing point on the display area of the display means 6 in the high-velocity mode, wherein the gazing point moves from P1 to P3 with a rapid velocity exceeding the threshold value.

The temporary gazing point memory means 10 stores the temporary gazing point information, i.e. the positional information after the past movement, by means of a three-dimensional matrix of the position of the gazing point immediately before the movement of the visual axis, the moving direction of visual axis and the velocity of movement of the visual axis. Stated differently, the temporary gazing point information means information on the actually moved gazing point, as a result of previous movement of the visual axis from a certain gazing point with a certain moving direction of the visual axis and a certain moving velocity.

In the high-velocity mode, the control means 5 reads, from the temporary gazing point memory means 10, a temporary gazing point position P2 which best matches the gazing point before the visual axis movement, the visual axis moving direction and the velocity of visual axis movement, and transmits the position P2 to the image transmitting side.

The image transmitting side effects image processing of higher definition only around thus transmitted temporary gazing point P2 and transmits thus processed image information to the image receiving side, which displays the image information as an image s2 on the display means.

The present embodiment, therefore, in response to a rapid movement of the visual axis with a velocity exceeding the threshold value, does not wait until the visual axis stops at P3 but displays the processed image s2 at the temporary gazing point position P2 where the visual axis is expected to reach according to the temporary gazing point information, so that the higher-definition image can be displayed at the destination of movement of the visual axis without time lag from the movement of the visual axis. In case the temporary gazing point P2 is different from the actual gazing point P3 after the movement, the image processing is immediately conducted for the gazing point P3 and thus processed image information is displayed as an image s3. Then the actual gazing point P3 is stored in the temporary gazing point memory means, as the gazing point to be used in the next movement of the visual axis.

Figure 10:
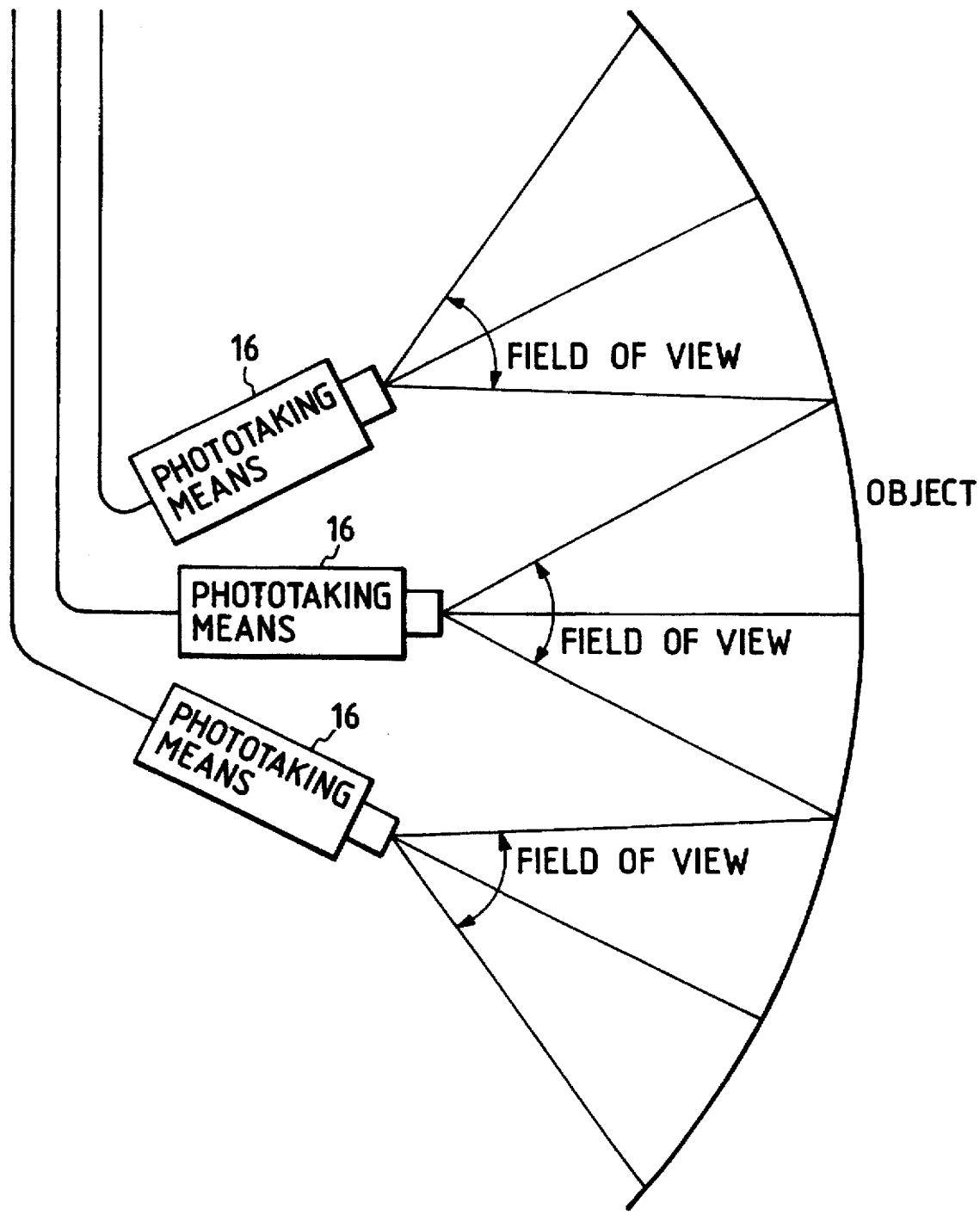
FIG. 10 is a schematic view showing the arrangement of plural phototaking means.

Also in the present embodiment, there may be employed, in the image transmitting side, plural phototaking means 16 in a fan-shaped arrangement as shown in FIG. 10 and the adjacent image selecting means may be provided, as in the first embodiment, in the peripheral part of the image in each phototaking means. In such case the adjacent image can be automatically selected according to the position of the visual axis in the peripheral area and to the moving direction of the visual axis, so that a high-definition image having a wide area obtained by joining the plural images, which cannot be obtained by a single phototaking means, can be viewed with a high speed without delay in operation.

Also the second embodiment is applicable to an image display device for simultaneously displaying plural independent images obtained by plural phototaking means by dividing the display image.

As explained in the foregoing, the present invention can provide a visual axis-controlled image display device enabling observation of the image information and associated operations in comfortable manner by detecting the visual axis information, such as the gazing point of the observer watching the image information displayed on the display means, the moving direction of the visual axis of the observer, and the velocity of movement of the visual axis, and suitably controlling the image information to be displayed on the display means based on the visual axis information.

Also according to the present invention there is provided an image display device capable of storing, in memory means, image information constituting an area wider than the display image area and reading the image information, for display on the display means, according to the visual axis information, wherein the image to be displayed next is determined from a combination of the position of the gazing point in the displayed image and the moving direction of the visual axis, so that the displayed image can be switched quicker than in the conventional art thereby not hindering the operations of the observer.

Furthermore there is provided a visual axis-controlled image display device for effecting image processing, for display, weighted in the vicinity of the gazing point according to the visual axis information, wherein, even in case the visual axis is moved at a high velocity exceeding a predetermined value, the weighted image area can be displayed without significant delay from the movement of the visual axis by means of temporary gazing point information obtained from the data of a past visual axis movement, namely the gazing point composed of the gazing point immediately before the visual axis movement, the moving direction of the visual axis, the velocity of visual axis movement and the gazing point after the visual axis movement whereby the operations of the observer are not hindered.

What is claimed is:

1. An image display device comprising:

first detection means for detecting a state of an eye of an observer;

second detection means for detecting a moving velocity of the eye and a moving direction of a visual axis according to signals detected by said first detection means; and means for predictingly calculating a gazing position of said observer based on said moving velocity and said moving direction.

2. An image display device according to claim 1, wherein said first detection means is adapted to detect a visual axis of said observer.

3. An image display device according to claim 2, wherein said second detection means is adapted to detect the change with time of visual axis of said observer.

4. An image display device according to claim 1, further comprising display means for forming an image and processing means for providing a higher-definition image in an area of said display means corresponding to said gazing position than in other areas.

* * * * *

UNITED STATES PATENT AND TRADEMARK OFFICE
CERTIFICATE OF CORRECTION

PATENT NO. : 5,717,413

DATED : February 10, 1998

INVENTOR(S) : Mizouchi, Satoru

It is certified that error appears in the above-identified patent and that said Letters Patent is hereby corrected as shown below:

Col. 5, line 43, delete "$s \cdot \cos \Theta$" and insert -- $s \cdot \cos \phi$ --.

Signed and Sealed this

Twenty-first Day of July, 1998

Attest:

Attesting Officer

BRUCE LEHMAN

*Commissioner of Patents and Trademarks*